(12) United States Patent
Morita et al.

(10) Patent No.: US 8,953,216 B2
(45) Date of Patent: Feb. 10, 2015

(54) ORIGINAL READER CAPABLE OF READING ORIGINALS OF VARIOUS SIZES AND METHOD OF READING ORIGINAL

(71) Applicant: Canon Kabushiki Kaisha, Tokyo (JP)

(72) Inventors: Kenji Morita, Toride (JP); Yohei Katto, Nagareyama (JP); Satoshi Seki, Abiko (JP); Akiko Kanno, Kashiwa (JP); Hidenori Sunada, Abiko (JP); Asahiro Nakayoshi, Matsudo (JP)

(73) Assignee: Canon Kabushiki Kaisha (JP)

( * ) Notice: Subject to any disclaimer, the term of this patent is extended or adjusted under 35 U.S.C. 154(b) by 42 days.

(21) Appl. No.: 13/798,511

(22) Filed: Mar. 13, 2013

(65) Prior Publication Data
US 2013/0242355 A1 Sep. 19, 2013

(30) Foreign Application Priority Data

Mar. 19, 2012 (JP) ................................. 2012-062070

(51) Int. Cl.
*G06K 15/02* (2006.01)
*G06F 3/12* (2006.01)
(Continued)

(52) U.S. Cl.
CPC ....... *H04N 1/00734* (2013.01); *H04N 1/00708* (2013.01); *H04N 1/00771* (2013.01); *H04N 1/00482* (2013.01); *H04N 2201/0081* (2013.01);
(Continued)

(58) Field of Classification Search
CPC . H04N 1/00; H04N 1/00278; H04N 1/00588; H04N 1/00708; H04N 2201/0081; B24B 4/00; B65H 3/06; B65H 2220/01; B65H 2220/03; B65H 2511/22; B65H 2220/02; B65H 2701/1313; B65H 2701/1311; B65H 2511/12; B65H 2511/11; B65H 2511/10; B65H 2201/0081; G03G 2215/00329
USPC ............ 358/1.2, 1.13, 426.07, 404, 444, 449; 399/365, 370, 376, 389; 271/186, 271/10.01, 69, 3.06, 3.09, 3.15
See application file for complete search history.

(56) References Cited

U.S. PATENT DOCUMENTS 5,907,759 A * 5/1999 Yashiro .......................... 399/371
6,219,156 B1 * 4/2001 Yoshida et al. .......... 358/426.07
(Continued)

FOREIGN PATENT DOCUMENTS

JP 2001-186335 A 7/2001
JP 2011-024098 A 2/2011

*Primary Examiner* — Charlotte M Baker
(74) *Attorney, Agent, or Firm* — Rossi, Kimms & McDowell LLP

(57) ABSTRACT

An original reader capable of being downsized without requiring a large-capacity image memory. A conveying path conveys an original. Sensors are arranged on the conveying path, for detecting the conveyed original. CCD line sensors read the conveyed original. A CPU of the image reader decides the size of the conveyed original based on the results of detection by the sensors. An image memory stores image data output from the line sensors. The CPU transmits the decided original size and the stored image data to a controller. When the CPU cannot decide the original size at a predetermined timing, it transmits one of original size candidates to the controller, as a provisional original size. When the size of the original decided afterwards is different from the provisional original size, the CPU retransmits the decided size of the original.

8 Claims, 16 Drawing Sheets

(51) Int. Cl.
*G03G 15/00* (2006.01)
*H04N 1/00* (2006.01)

(52) U.S. Cl.
CPC ............... *H04N 2201/33321* (2013.01); *H04N 2201/33328* (2013.01); *H04N 2201/33335* (2013.01); *H04N 2201/33378* (2013.01)
USPC ........... 358/1.2; 358/1.13; 399/365; 399/370; 399/376; 399/389

(56) References Cited

U.S. PATENT DOCUMENTS

| | | | |
|---|---|---|---|
| 6,585,258 B1* | 7/2003 | Hirota et al. | 271/186 |
| 8,654,365 B2* | 2/2014 | Nagata | 358/1.13 |
| 2012/0081759 A1* | 4/2012 | Itoh | 358/449 |
| 2012/0120418 A1* | 5/2012 | Okayama | 358/1.2 |
| 2013/0044339 A1* | 2/2013 | Takahashi | 358/1.13 |

* cited by examiner

FIG. 5C

```
READING CONFIGURATION
FULL COLOR ▼    RESOLUTION: 200x200dpi ▼
MAGNIFICATION        READING SIZE
    100%                  AUTO
[DIRECT MAGNIFICATION ▶] [READING SIZE ▶]

☐ READING MODE                        ◀ AUTO ▶
[DETAILED        ▼]  ☐ REGISTER    [TEXT/PHOTO ▼]
 SETTINGS              /DELETE     [APPLIED MODE ▶]

[CANCEL]                              [OK]

[SYSTEM STATUS/ABORT ▶]
```

FIG. 5D

```
                      APPLIED MODE
┌──────────┬──────────┬──────────┬──────────┐
│DUPLEX-TO-│COVER/    │REDUCED   │MOVE      │
│DUPLEX    │INTERLEAVED│LAYOUT   │          │
│COPY    ▶ │SHEET   ▶ │        ▶│         ▶│
├──────────┼──────────┼──────────┼──────────┤
│BOOK-     │OHP       │JOB       │BINDING   │
│BINDING   │INTERLEAF │TERMINATION│MARGIN   │
│        ▶ │        ▶ │NOTIFICATION▶│     ▶ │
├──────────┼──────────┼──────────┼──────────┤
│MIXED     │CONTINUOUS│READ IMAGE│FRAME     │
│ORIGINALS-│READING   │CHECK     │ERASE     │
│READING ▶ │        ▶ │        ▶ │        ▶ │
└──────────┴──────────┴──────────┴──────────┘
     [▼]    1/2  [ / ]            [CLOSE]
```

AB SYSTEM

| ORIGINAL WIDTH DETECTION SENSOR 27 | WIDTH DETECTION SENSOR 28(a) | WIDTH DETECTION SENSOR 28(b) | WIDTH DETECTION SENSOR 28(c) | WIDTH DETECTION SENSOR 28(d) | STATE OF POST-SEPARATION SENSOR 11 WHEN ORIGINAL LEADING EDGE HAS REACHED PRE-REGISTRATION SENSOR 14 | DETECTED SIZE |
|---|---|---|---|---|---|---|
| WIDTH>272mm | ON<br>ON<br>OFF<br>OFF | ON<br>OFF<br>OFF<br>OFF | | | ON<br>OFF<br>ON<br>OFF<br>ON<br>OFF | A3<br>A4<br>B4<br>B5<br>A4R<br>A5<br>B5R |
| 272mm≥WIDTH >247mm | ON<br>ON<br>OFF<br>OFF | | ON<br>ON | OFF | ON<br>OFF<br>ON<br>OFF | B4<br>B5<br>A4R<br>A5<br>B5R<br>A5R |
| 247mm≥WIDTH >200mm | | ON<br>ON<br>OFF<br>OFF | ON<br>OFF<br>OFF | ON<br>OFF | ON<br>OFF<br>ON<br>OFF | A4R<br>A5<br>B5R<br>A5R<br>B6R |
| 200mm≥WIDTH >172mm | | OFF | ON<br>OFF<br>OFF | | ON<br>OFF | B5R<br>A5R<br>B6R |
| 172mm≥WIDTH | | | ON<br>OFF | | | A5R<br>B6R |

*FIG. 6B*

INCH SYSTEM

| ORIGINAL WIDTH DETECTION SENSOR 27 | WIDTH DETECTION SENSOR 28(a) | WIDTH DETECTION SENSOR 28(b) | WIDTH DETECTION SENSOR 28(c) | WIDTH DETECTION SENSOR 28(d) | STATE OF POST-SEPARATION SENSOR 11 WHEN ORIGINAL LEADING EDGE HAS REACHED PRE-REGISTRATION SENSOR 14 | DETECTED SIZE |
|---|---|---|---|---|---|---|
| WIDTH>272mm | | ON<br>ON | | | ON<br>OFF | LDR<br>LTR |
| 272mm≥WIDTH<br>>200mm | | ON<br>ON<br>OFF | | | OFF | LGL/LTRR<br>STMT<br>STMTR |
| 272mm≥WIDTH | | | | | | STMTR |

FIG. 9
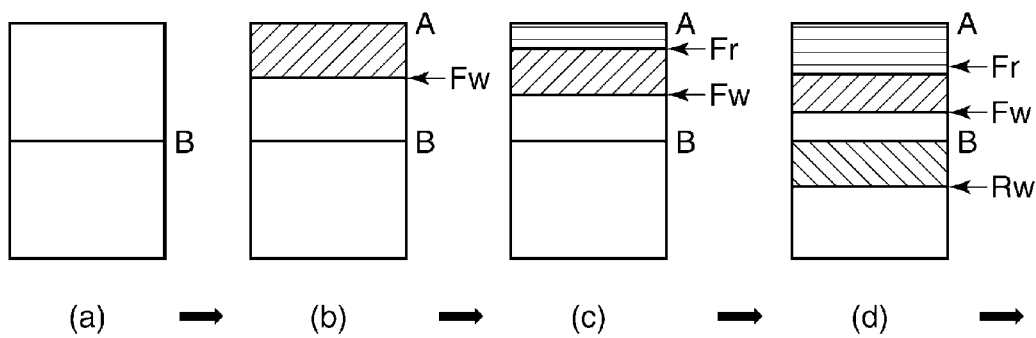
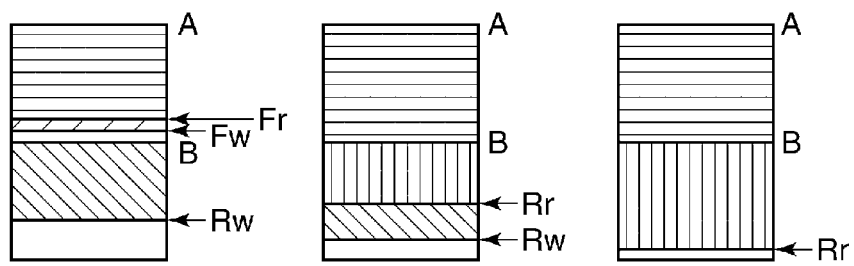
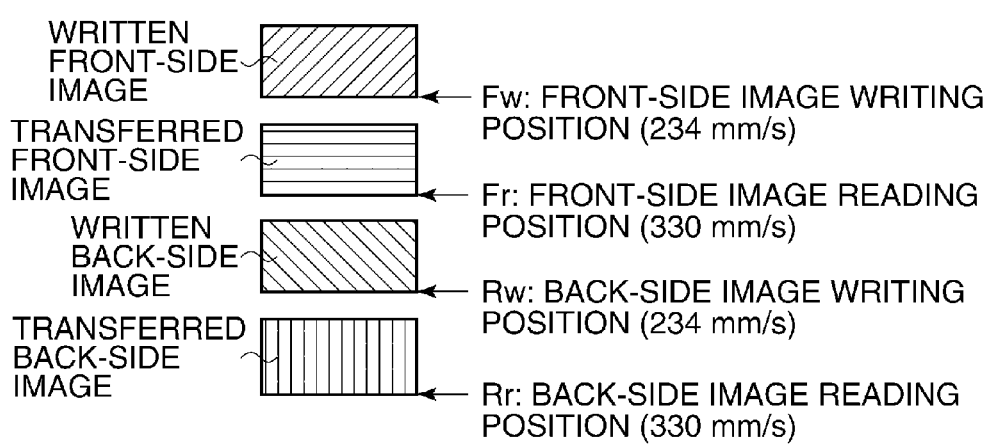

ORIGINAL READER CAPABLE OF READING ORIGINALS OF VARIOUS SIZES AND METHOD OF READING ORIGINAL

BACKGROUND OF THE INVENTION

1. Field of the Invention

The present invention relates to an original reader that reads an image from an original that is conveyed, and a method of reading an original.

2. Description of the Related Art

A copying machine and a facsimile machine are provided with respective original readers. Original readers are also known which are each equipped with an automatic document feeder (ADF).

Many of such original readers have a function which requires detection of the size of an original (hereafter also referred to as an original size) before the start of reading an image therefrom. Examples of the function that requires detection of an original size before reading an image include an automatic sheet selection function, an automatic magnification selection function, and so forth.

The automatic sheet selection function is a function that automatically selects a sheet of a proper size according to an original size, a designated magnification, and whether or not to execute image rotation processing. Further, the automatic magnification selection function is a function that calculates a degree of magnification of an image in order to reduce or enlarge a read original image based on a designated sheet size, and automatically sets the calculated magnification. The above-described functions, such as the automatic sheet selection function and the automatic magnification selection function, are executed by a controller of an image processing apparatus.

In a case where the size of an original is detected before the start of reading the original image, an original reader that has a conveying path of which the length between an original feeding position and an image reading start position is short is configured such that reading of the original image is started, after the original is conveyed to an inversion path and is inverted to finalize the size of the original. However, such configuration causes an increase in the size of the original reader and reduction of reading productivity.

To cope with the above problem, there has been proposed an original reader which provisionally decides an original size before the start of reading an original image, reading of an original to be read is started using the provisionally decided original size, and when an actual size of the original to be read and the provisionally decided original size are different, the original to be read is inverted to thereby reread the original image (see e.g. Japanese Patent Laid-Open Publication No. 2011-24098).

Further, there has also been proposed an image forming apparatus which is configured such that for the automatic magnification selection function, a memory having a capacity large enough to store two pages of original images is provided in advance, and reading of a original image with a size yet to be finalized and scaling processing of an original image with a finalized size are performed in parallel (see e.g. Japanese Patent Laid-Open Publication No. 2001-186335).

On the other hand, at present, to read images on both sides of an original, an original reader of a so-called one-pass double-sided simultaneous reading type is predominantly used which has a back side-reading unit mounted on a conveying path, besides a usual front side-reading unit, such that images on both sides can be read only by a single conveyance of the original, to thereby dispense with an inversion path.

However, when an original bundle in which originals of various sizes are mixed is to be read using the original reader of the one-pass double-sided simultaneous reading type, to execute the automatic sheet selection function or the automatic magnification selection function, it is necessary to detect the size of each original. Further, to enable detection of the size of each original, it is necessary to lengthen the conveying path from the original feeding position to the image reading start position or additionally provide an inversion path. This causes an increase in the size of the original reader and an increase in manufacturing costs thereof.

Further, in the original reader of the one-pass double-sided simultaneous reading type, to buffer image data read from the back side of the original until completion of transfer of image data read from the front side of the original, an image memory is provided which stores one page of image data. If the configuration disclosed in Japanese Patent Laid-Open Publication No. 2001-186335 is applied to such an original reader, it is necessary to provide an image memory for storing one more page of image data, which causes an increase in manufacturing costs of the original reader.

SUMMARY OF THE INVENTION

In a first aspect of the present invention, there is provided an original reader comprising a conveying unit configured to convey an original, an original detection unit disposed in a conveying path for conveying the original and configured to detect the conveyed original, a reading unit configured to read the conveyed original, a decision unit configured to decide a size of the original conveyed by the conveying unit based on a result of detection by the original detection unit, a storage unit configured to store image data output from the reading unit, and a communication unit configured to transmit the size decided by the decision unit and the image data stored in the storage unit, wherein if the decision unit cannot decide the size of the original at a predetermined timing, the communication unit transmits one of a plurality of original sizes, which are candidates of the size of the original to be decided based on a result of detection by the original detection unit, as a provisional original size, and wherein after the decision unit has decided the size of the original, if the size of the original decided by the decision unit is different from the provisional original size, the communication unit retransmits the size of the original decided by the decision unit.

In a second aspect of the present invention, there is provided an original reader comprising a conveying unit configured to conveying an original, an original detection unit disposed in a conveying path for conveying the original and configured to detect the conveyed original, a first reading unit configured to read a first side of the conveyed original, a second reading unit configured to read a second side of the conveyed original, which is different from the first side, a storage unit configured to store first image data output from the first reading unit and second image data output from the second reading unit, and a control unit configured to control writing of the first image data and the second image data in the storage unit, and reading of the first image data and the second image data stored in the storage unit, wherein the control unit sets a write start position at which the second image data starts to be written in the storage unit, after a storage area in which the first image data is written, and wherein the control unit writes part of the second image data in a storage area from which the first image data written in the storage unit has been read out from the storage unit.

According to the first aspect of the present invention, it is possible to downsize the original reader without requiring a large-capacity image memory.

According to the second aspect of the present invention, it is possible for the original reader of the one-pass double-sided simultaneous reading type to read originals of various sizes without requiring a large-capacity image memory.

Further features of the present invention will become apparent from the following description of exemplary embodiments with reference to the attached drawings.

BRIEF DESCRIPTION OF THE DRAWINGS

FIGS. 5A to 5E are views showing examples of screens displayed on a console section appearing in FIG. 3.

FIGS. 6A and 6B are views of decision tables for use in detecting original sizes in a mixed originals-reading mode.

FIG. 9 is a view of an example of a storage state of an image memory in a case where an original size is finalized before the start of reading an original image.

DESCRIPTION OF THE EMBODIMENTS

The present invention will now be described in detail below with reference to the accompanying drawings showing embodiments thereof.

Figure 1:
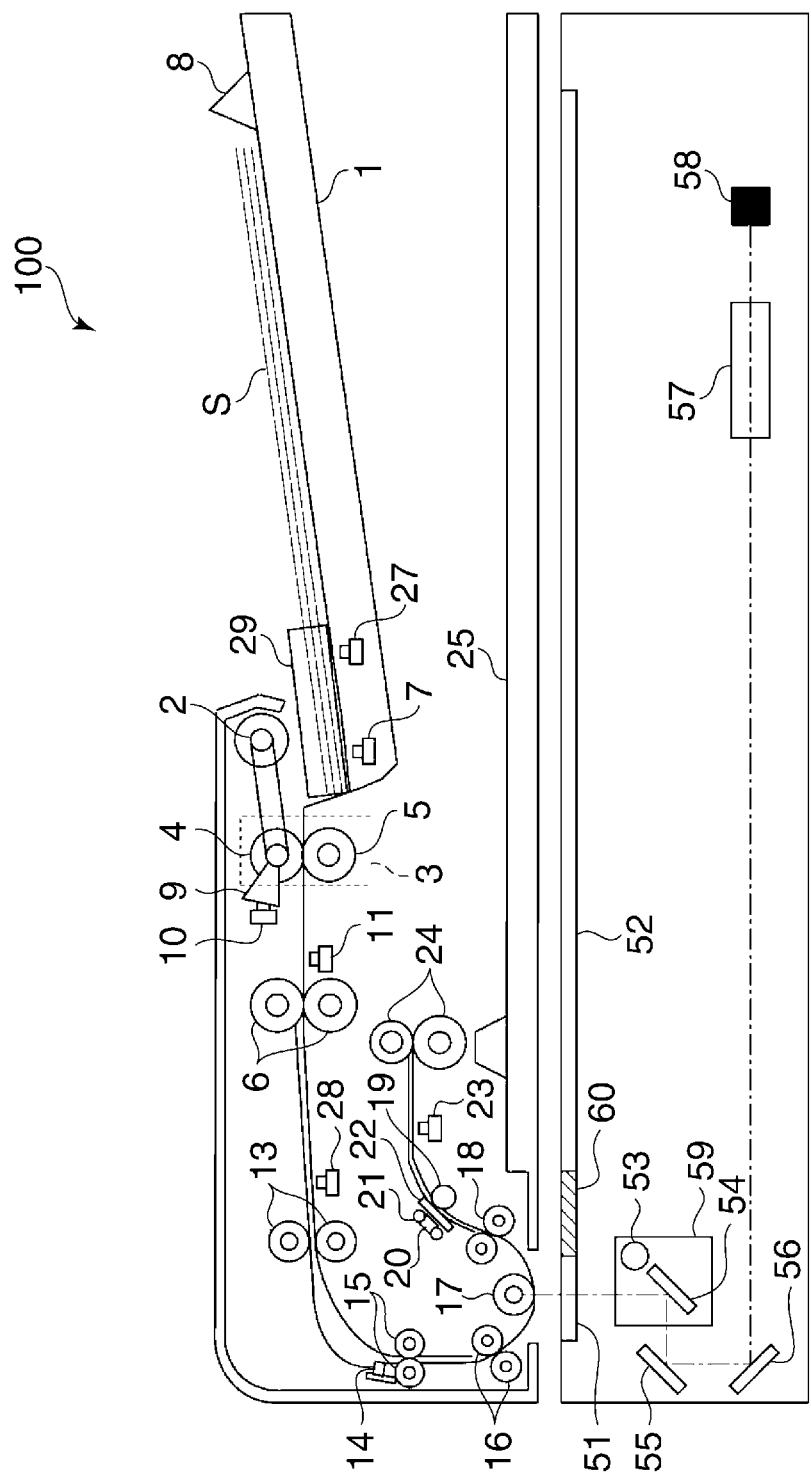
FIG. 1 is a schematic longitudinal cross-sectional view of an original reader according to an embodiment.

FIG. 1 is a schematic longitudinal cross-sectional view of an original reader according to an embodiment of the present invention.

Figure 3:
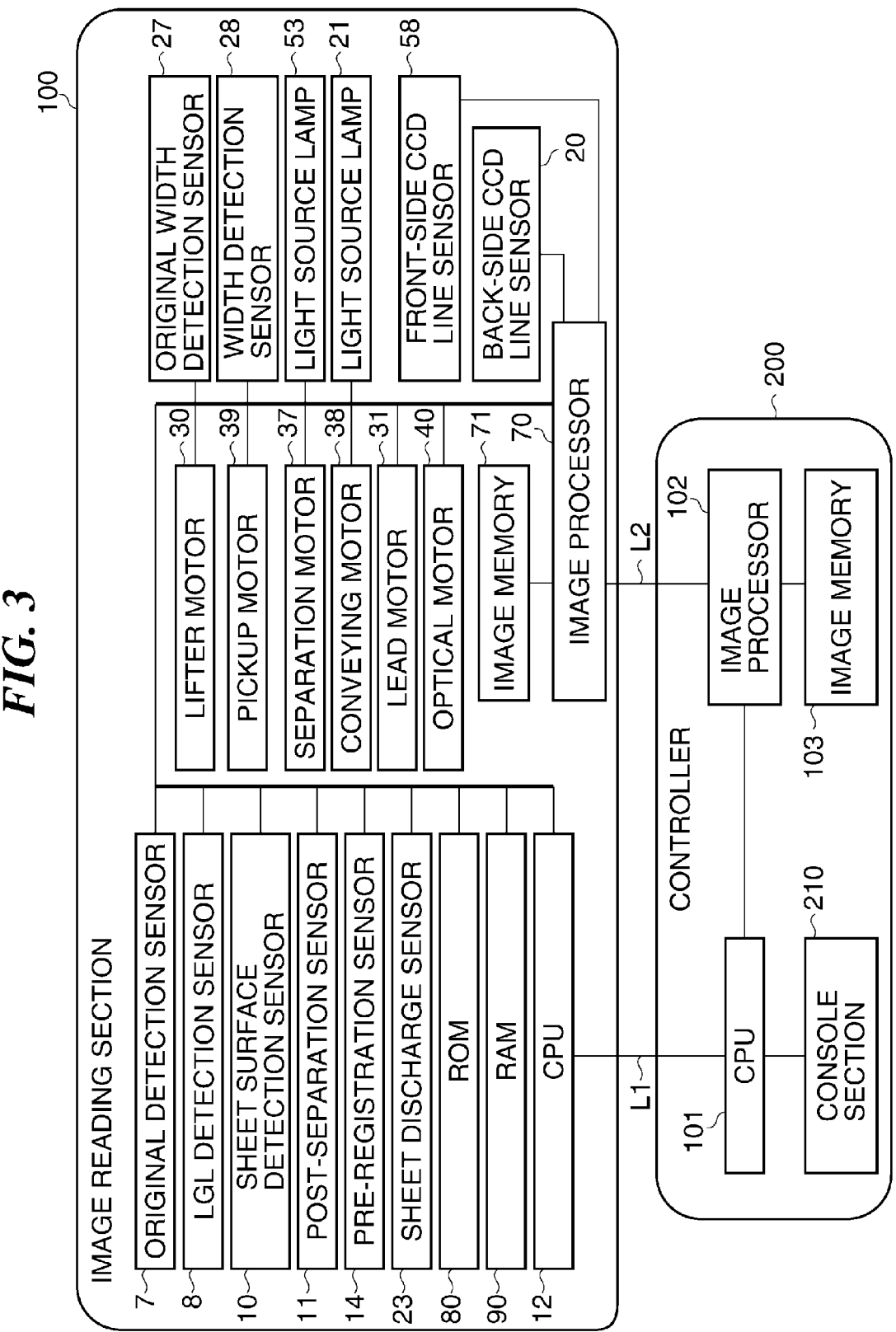
FIG. 3 is a block diagram of an image reading section and a controller appearing in FIG. 1.

Referring to FIG. 1, the original reader according to the present embodiment comprises an image reading section 100 and a controller 200 (see FIG. 3).

The image reading section 100 is equipped with a stationary original-reading mode and a moving original-reading mode. In the stationary original-reading mode, a front side-reading unit 59 is caused to slide in parallel with a platen glass 52, to thereby read an original set on the platen glass 52 using a front-side CCD (charge coupled device) line sensor 58. In the moving original-reading mode, the front side-reading unit 59 is fixed, and an original is conveyed and caused to pass above the front side-reading unit 59, to thereby read the original using the front-side CCD line sensor 58. Hereinafter, a description will be given of a control operation in the moving original-reading mode.

The image reading section 100 includes a vertically movable original tray 1 on which an original bundle S formed of at least one sheet (original) is placed, and a pickup roller 2 which conveys an uppermost original of the original bundle S to the original reader. Note that a white plate 60 is read by the front-side CCD line sensor 58 before an original is read, whereby white level reference data for a front-side image of the original is generated for use in shading correction. Further, when the reading mode is a double-sided reading mode, white level reference data for the front-side image of the original is generated, and at the same time a white plate (not shown) attached to a moving glass 22 is read to generate white level reference data for a back-side image of the original.

At the start of conveyance of the original from the original tray 1, the pickup roller 2 is moved downward, and a lifter motor 30 (see FIG. 3) is driven to move the original tray 1 upward. When the uppermost original of the original bundle S reaches a feeding position, a sheet surface detection flag 9 which rotates in a manner interlocked with the pickup roller 2 in contact with the uppermost original blocks a sheet surface detection sensor 10 to cause the same to output an ON signal to stop the upward movement of the original tray 1.

When an original feeding operation is started, an original fed by the pickup roller 2 is separated from the original bundle S by action of a separation roller pair 3 formed by a feed roller 4 and a retard roller 5. This separation is realized by a well-known retard separation method. The separated original is conveyed by a pull-off roller pair 6 and a conveyance roller pair 13 while passing a post-separation sensor 11 (original detection unit) and a pre-registration sensor 14 (original detection unit), and is brought into abutment with a registration roller pair 15. This forms a loop (bend) toward a leading edge of the original, to thereby eliminate the skew of the original caused by conveyance thereof.

The original having passed through the registration roller pair 15 is conveyed to a platen upstream roller pair 16 and a platen roller 17. Here, the platen roller 17 is in contact with a moving original-reading glass 51, and the front side of the original passing through the platen roller 17 is illuminated with a light source lamp 53. Reflected light from the front side of the original reaches the front-side CCD line sensor 58 via mirrors 54 to 56 and a lens 57. This enables the front-side (a first-side or second-side) CCD line sensor 58 (a first reading unit or second reading unit) to read a front-side image of the original.

The original conveyed by the platen roller 17 passes through a platen downstream roller pair 18, and is conveyed to a back side-reading roller 19. Here, the back side-reading roller 19 is in contact with the moving glass 22, and the back side of the original passing the back side-reading roller 19 is illuminated with a light source lamp 21. Reflected light from the back side of the original reaches a back-side (a second-side or first-side) CCD line sensor 20 (a second reading unit or first reading unit), which enables the back-side CCD line sensor 20 to read a back-side image of the original.

The original conveyed by the back side-reading roller 19 passes a sheet discharge sensor 23, and is then discharged onto an original discharge tray 25 by a discharge roller pair 24.

Figure 2:
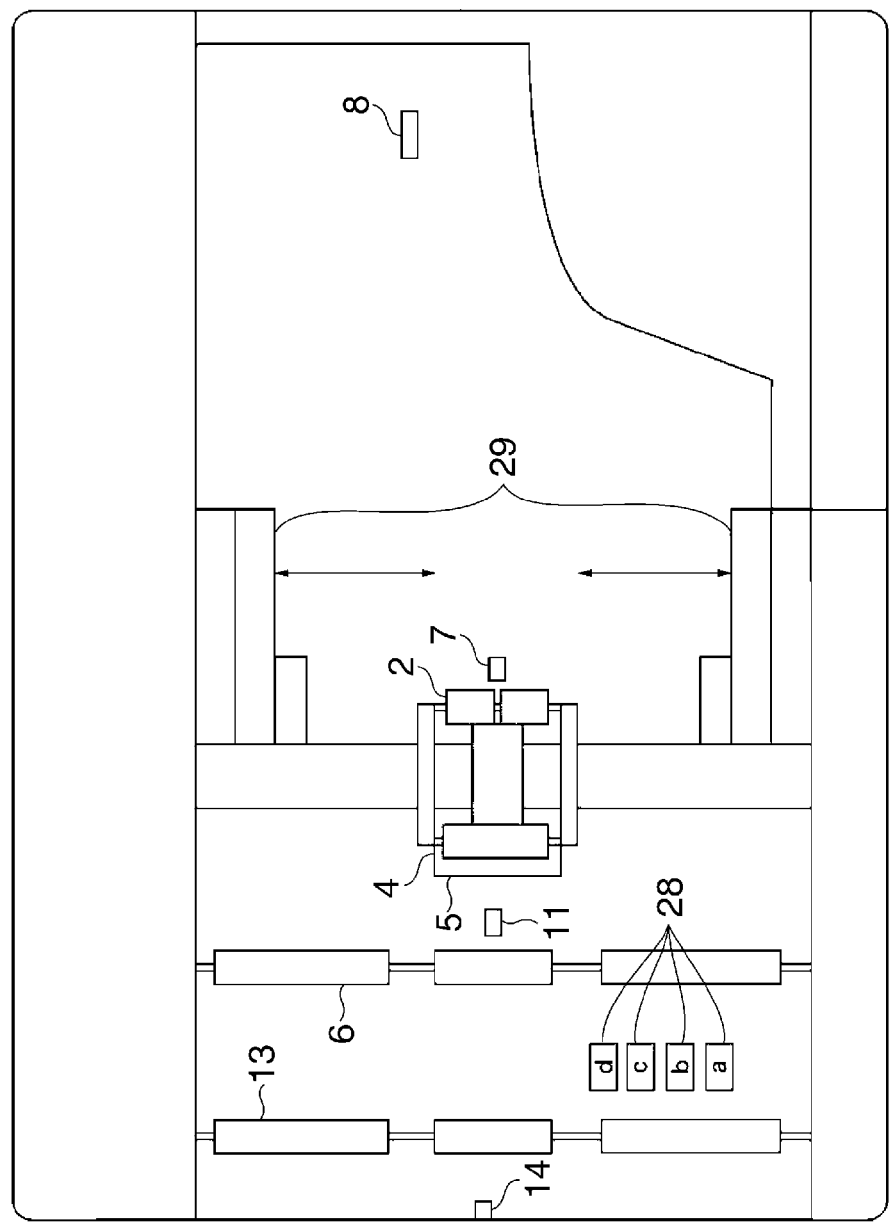
FIG. 2 is a plan cross-sectional view of the original reader in FIG. 1 in which positions of various types of sensors arranged inside the reader are illustrated.

The original tray 1 is provided with a guide control plate 29 slidable in a main scanning direction of the placed original bundle S (direction orthogonal to an original conveying direction), and an original width detection sensor 27 for detecting the width of an original (the length of an original in the main scanning direction). Further, a width detection sensor 28 comprising four sensors "a" to "d" arranged in the main scanning direction as shown in FIG. 2, is disposed in a conveying path, for detecting the width of an original being conveyed. In a case where a mixed originals-reading mode is not selected, the detection sensor 28 is not used. The size of the original being conveyed is determined by a combination of outputs from the original width detection sensor 27, the pre-registration sensor 14, the post-separation sensor 11, and an LGL detection sensor 8.

FIG. 3 is a block diagram of the image reading section 100 and the controller 200 appearing in FIG. 1.

The image reading section 100 includes a CPU (central processing unit) 12, a ROM (read only memory) 80, and a RAM (random access memory) 90. The ROM 80 stores control programs, and the RAM 90 stores input data, work data, and so forth.

Further, various motors 30, 31 and 37 to 40 are connected to respective associated output ports, not shown, of the image reading section 100. The lifter motor 30 lifts up and down the original tray 1. The lead motor 31 drives the platen upstream roller pair 16, the platen roller 17, the platen downstream roller pair 18, the back side-reading roller 19, and the discharge roller pair 24, for rotation. The separation motor 37 drives the pickup roller 2, the feed roller 4, and the retard roller 5, for rotation. The conveying motor 38 drives the pull-off roller pair 6 and the conveyance roller pair 13, for rotation. The pickup motor 39 lifts up and down the pickup roller 2. The optical motor 40 drives the front side-reading unit 59.

Furthermore, the light source lamps 21 and 53 as well are connected to respective associated output ports, not shown, of the image reading section.

Further, connected to respective associated input ports, not shown, of the image reading section 100 are an original detection sensor 7, the LGL detection sensor 8, the sheet surface detection sensor 10, the post-separation sensor 11, the pre-registration sensor 14, and the sheet discharge sensor 23.

Image data associated with images read from the front side and the back side of the original, read by the front-side CCD line sensor 58 and the back-side CCD line sensor 20, are temporarily stored in an image memory 71 (storage unit) via an image processor 70.

The controller 200 includes a CPU 101, an image processor 102, an image memory 103, and a console section 210. The CPU 101 of the controller 200 transmits and receives the size of a conveyed original and data for controlling the image reading section 100 to and from the CPU 12 of the image reading section 100 via a serial communication line L1. The image processor 102 of the controller 200 receives image data stored in the image memory 103 from the image processor 70 of the image reading section via an image line L2. Image data transmitted from (the image processor 70 of) the image reading section 100 is stored in the image memory 103. Further, using the console section 210 of the controller 200, a user gives control instructions to the CPU 101.

Figure 4:
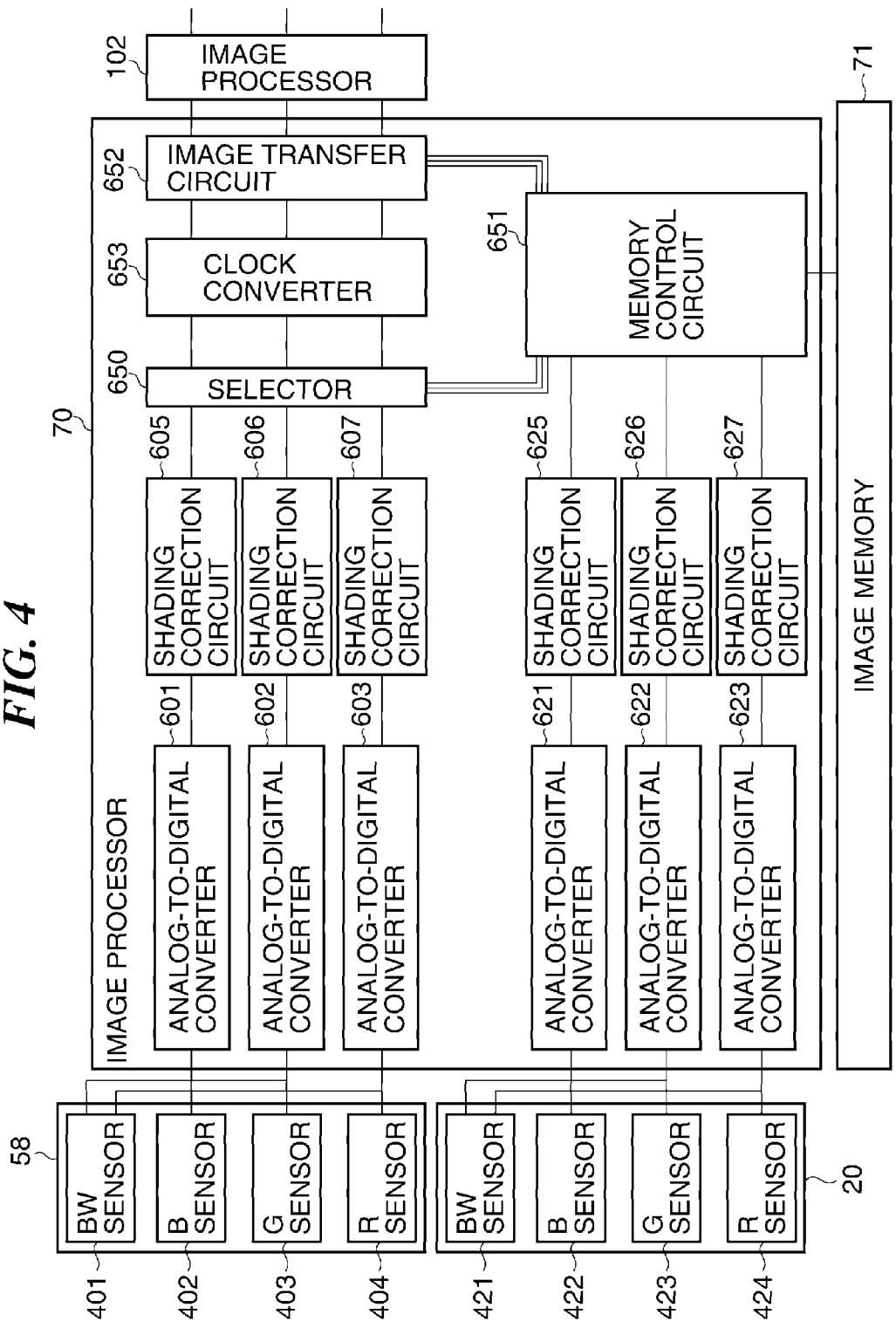
FIG. 4 is a detailed block diagram of an image processor appearing in FIG. 3.

FIG. 4 is a detailed block diagram of the image processor 70.

To read an image on the front side of an original (hereinafter referred to as the "front-side image"), BW (black-and-white), B (blue), G (green), and R (red) analog electric signals are output from sensors 401 to 404 of the front-side CCD line sensor 58 according to the read image. The respective analog electric signals are converted to digital image data items by analog-to-digital converters 601 to 603.

Shading correction circuits 605 to 607 correct the digital image data converted by the analog-to-digital converters 601 to 603 according to non-uniformity of a light amount and non-uniformity of pixel sensitivity of the front-side CCD line sensor 58.

A selector 650 switches between writing of image data associated with the front-side image, output from the shading correction circuits 605 to 607 (hereinafter referred to as the "front-side image data"), in the image memory 71 via a memory control circuit 651 and transmission of the front-side image data to an image transfer circuit 652 via a clock converter 653.

On the other hand, to read an image on the back side of an original (hereinafter referred to as the "back-side image"), BW (black-and-white), B (blue), G (green), and R (red) analog electric signals are output from sensors 421 to 424 of the back-side CCD line sensor 58 according to the read image. The respective analog electric signals are converted to digital image data by analog-to-digital converters 621 to 623. Image data associated with the back side image (hereinafter referred to as the "back-side image data") is subjected to shading correction by shading correction circuits 625 to 627, and is stored in the image memory 71 via the memory control circuit 651.

The image data stored in the image memory 71 is read out by the memory control circuit 651 in predetermined timing, and is transmitted to the image transfer circuit 652. The image transfer circuit 652 transfers the image data from the clock converter 653 or the image data from the memory control circuit 651 to the image processor 102 of the controller 200.

In the present embodiment, a memory with a capacity (e.g. 256 Mbytes) capable of storing a one large-sized page of a color image is used as the image memory 71. When both sides of an A3-size color original are read at a resolution of 600 dpi, it is impossible to simultaneously store image data of both the front side and the back side of the original in the image memory 71. Therefore, the front-side image data is transmitted to the image transfer circuit 652 via the clock converter 653, without being stored in the image memory 71 whereas the back-side image data is stored in the image memory 71 via the memory control circuit 651. Then, after completion of the transfer of the front-side image data, the back-side image data is read out from the image memory 71, and is transmitted to the image transfer circuit 652 via the memory control circuit 651.

Further, it is possible to divide the memory area of the image memory 71. For example, when the memory control circuit 651 designates division of the memory area of the image memory 71 for two pages (two-page division), the image memory 71 is made capable of storing two pages of image data at the maximum, by using half of the total storage capacity of the image memory 71 (128 Mbytes in the present embodiment) for a single page. Furthermore, the image memory 71 is configured to be capable of being operated in an overlap mode. In the overlap mode, it is possible to designate a desired location of the image memory 71 as a write and read-out start position for back-side image data, and when the write and read-out start position reaches an end of the image memory 71, the writing and reading-out of the back-side image data are performed from the start of the image memory 71. Further, the image memory 71 has a memory-based scaling function for reducing the size of image data stored in the image memory 71 and reading out the same to the controller 200.

FIGS. 5A to 5E are views showing examples of screens displayed on the console section 210 appearing in FIG. 3.

The console section 210 has a liquid crystal display section implemented as a touch panel, and is capable of displaying software keys on a screen. The user can set a reading mode (such as a full-color mode or a grayscale mode), a double-sided reading mode, an automatic scaling mode, and so forth, by using the console section 210.

Figure 5A:
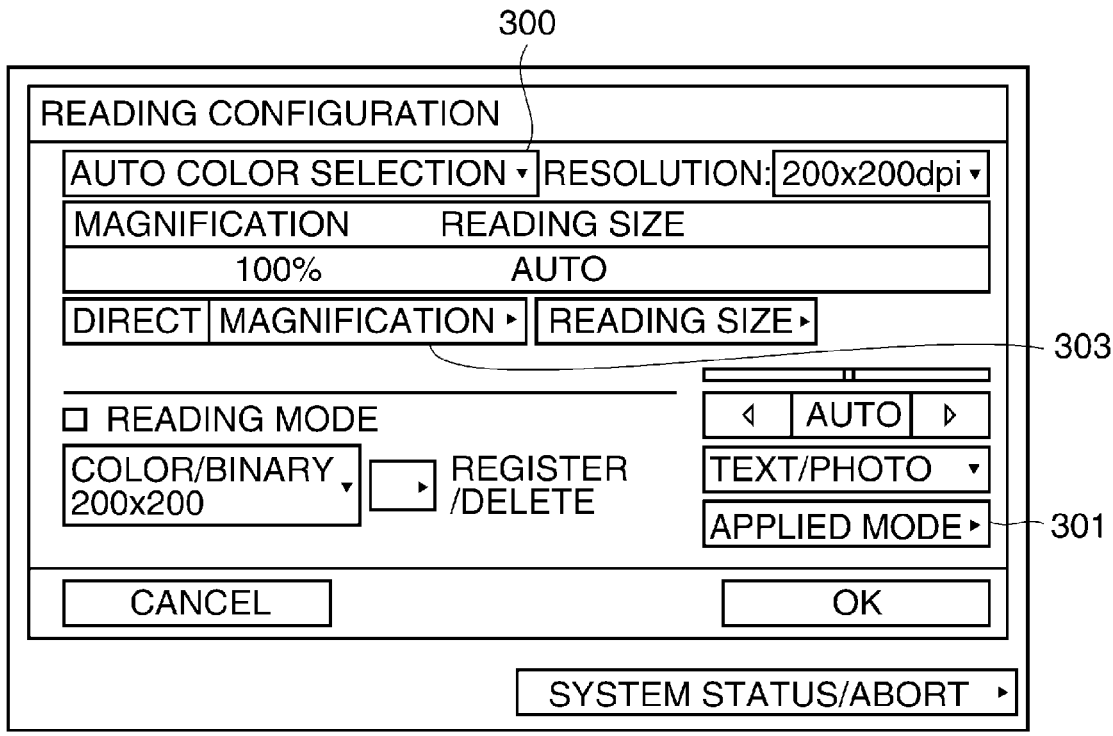
Figure 5B:
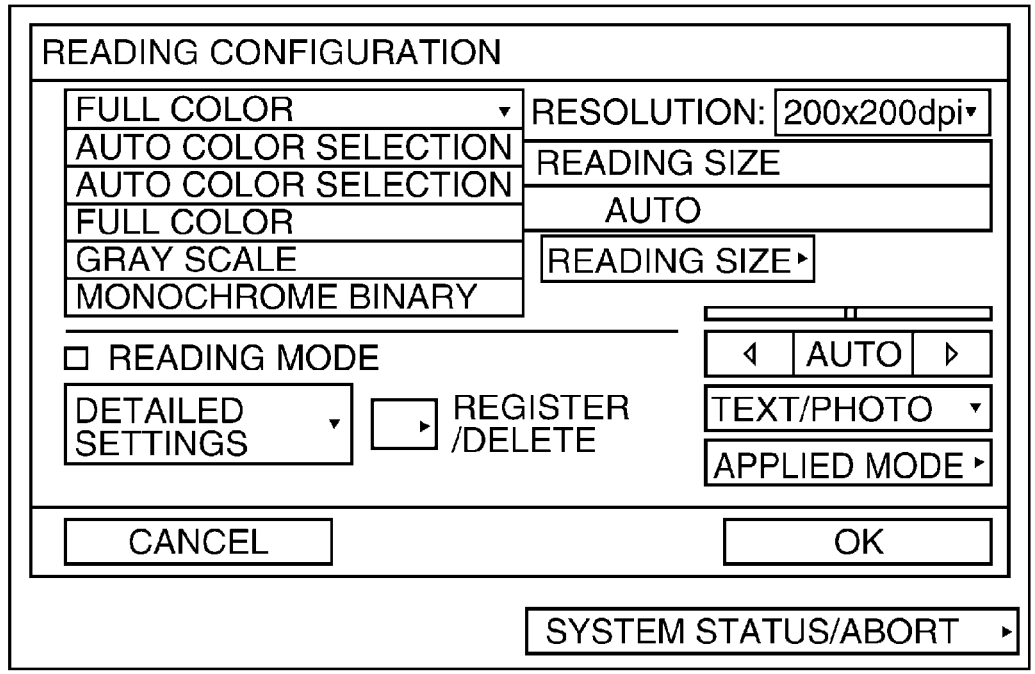

When a color/monochrome selection button 300 is depressed on a FIG. 5A screen, a pull-down menu for selecting one of color modes and monochrome modes is displayed, as shown in FIG. 5B. When the full-color mode is selected on the FIG. 5B screen, the screen is switched to a screen shown in FIG. 5C, thus setting reading in the color mode. Here, the color mode is for reading the original image in color, and the monochrome mode is for reading the same in monochrome.

Further, when an applied mode button 301 is depressed on the FIG. 5A screen, the screen is switched to a screen shown in FIG. 5D. When a mixed originals-reading mode button 302 is depressed on the FIG. 5D screen, the mixed originals-reading mode is set.

Figure 5E:
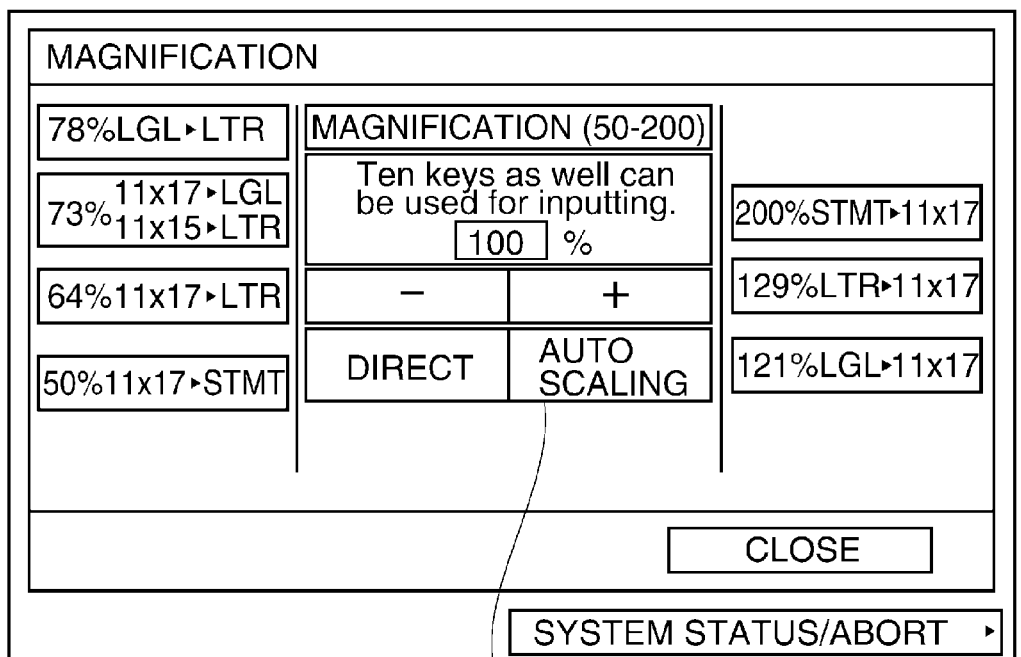

Furthermore, when a magnification button 303 is depressed on the FIG. 5A screen, the screen is switched to a screen shown in FIG. 5E. When an automatic scaling button 304 is depressed on the FIG. 5E screen, the automatic scaling mode is set.

In a case where the mixed originals-reading mode is set and further the automatic scaling mode is set, the size of each original is detected on a sheet-by-sheet basis, and each original is read by changing reading speed such that data having a designated recording size is read from the original having the detected original size.

Next, a description will be given of the mixed originals-reading mode.

In the present embodiment, the "mixed originals-reading mode" includes a same-width mixed originals-reading mode and a different-width mixed originals-reading mode. The same-width mixed originals-reading mode is for reading each original of an original bundle formed of originals having the same width but different lengths. The different-width mixed originals-reading mode is for reading each original of an original bundle formed of originals having different widths and lengths.

An automatic sheet selection function and an automatic magnification selection function are mainly used when the mixed originals-reading mode is designated. To realize these functions, it is required to read each original of an original bundle formed of mixed originals having different sizes after finalizing the size of each original and a reading magnification of each original.

In the mixed originals-reading mode, the results of detection by the LGL detection sensor 8 cannot be used, and hence in the conventional original reader provided with an inversion path, the size of each original is finalized by idly inverting the original once, as described hereinabove. Further, in the conventional original reader without the inversion path, the size of each original is finalized by making a conveying path long and combining outputs from the original width detection sensor 27, the pre-registration sensor 14, the post-separation sensor 11, and the width detection sensor 28, as described hereinabove. However, in the original reader according to the present embodiment, a conveying path (defined in the present embodiment as a path from the post-separation sensor 11 to the pre-registration sensor 14) is made short (the distance between the pre-registration sensor 14 and the post-separation sensor 11 is 220 mm) so as to reduce the size of the original reader. Therefore, it is impossible to detect the size of each original by combining outputs from the original width detection sensor 27, the pre-registration sensor 14, the post-separation sensor 11, and the width detection sensor 28. That is, some of originals cannot have their size detected before each of them reaches a front side-reading position corresponding to the location of the platen roller 17 and an original image starts to be read therefrom at the position.

FIGS. 6A and 6B show the correspondence between a combination of results of outputs from a plurality of sensors and detected sizes of originals in the mixed originals-reading mode. As shown in FIG. 6B, for example, the length of an original of a letter (LTR) size (hereinafter referred to as the "LTR size"), placed by making the longitudinal direction of the original coincident with a conveying direction, and the length of an original of a legal (LGL) size (hereinafter referred to as the "LGL size") (the length of a side of the original in the conveying direction) exceed 220 mm which is the length of the conveying path. Therefore, it is impossible to detect the sizes of these originals before the start of reading images on the originals.

In the present embodiment, to enable an original reader having such a short conveying path to read images on both sides of an original only by a single conveyance of the original, the following processing is executed: First, the LGL size (size of an original having the longest length of all possible originals) is once notified as an original size to be notified to the controller 200 before transfer of image data. Then, the original is read with a maximum reading magnification that can be designated (100% in the present embodiment), and image data of the original is stored in the image memory 71.

Hereinafter, control processes executed by the original reader will be described in detail with reference to FIGS. 7A to 11.

Figure 7A:
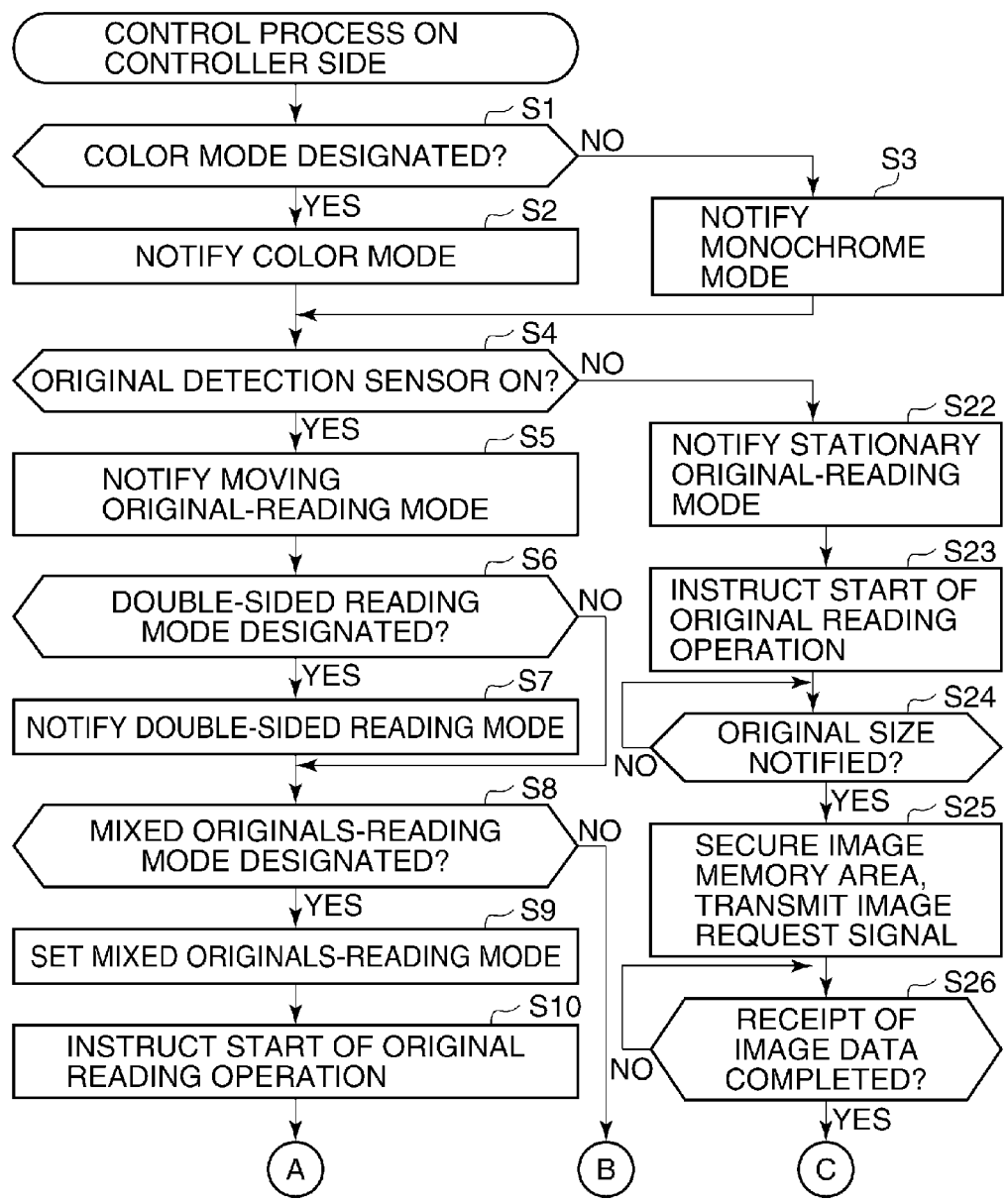
FIGS. 7A and 7B are a flowchart of a control process executed by the controller, particularly a CPU thereof, from the start of reading originals to the end of the same.
Figure 7B:
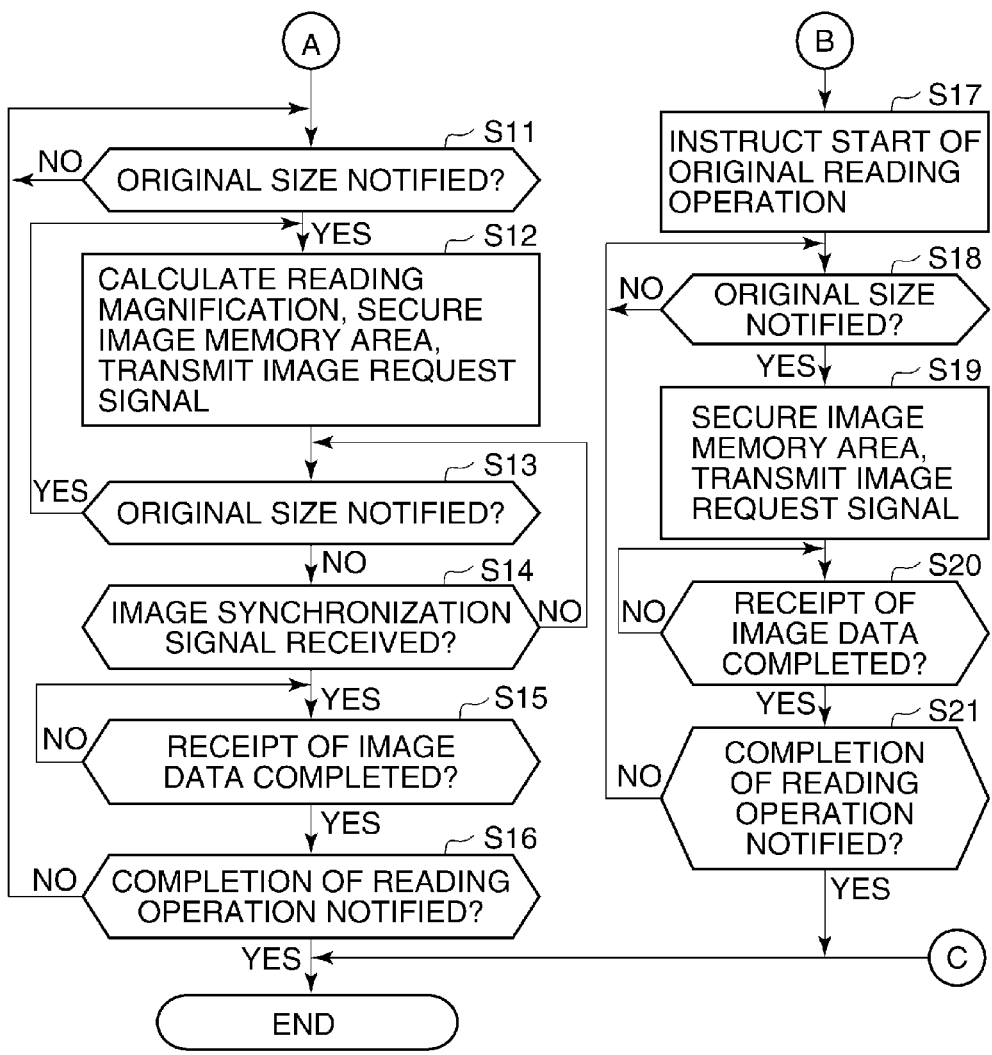

FIGS. 7A and 7B are a flowchart of a control process executed by the controller 200, particularly by the CPU 101, from the start of reading originals to the end of the same. The present control process is executed in response to the user's depression of a start key (not shown) displayed on the console section 210.

First, the CPU 101 determines whether or not a color mode is designated (step S1). If it is determined that a color mode is designated, the CPU 101 notifies the CPU 12 of the image reading section 100 of designation of a color mode (step S2). On the other hand, if it is determined that a color mode is not designated, the CPU 101 notifies the CPU 12 of designation of a monochrome mode (step S3).

Next, the CPU 101 communicates with the CPU 12 to acquire on/off information of the original detection sensor 7, and determines, based on the on/off information, whether or not there is any original placed on the original tray 1 of the image reading section 100 (step S4). If it is determined that the off information has been output from the original detection sensor 7, i.e. that no original is placed on the original tray 1, the CPU 101 notifies the CPU 12 of selection of the stationary original-reading mode and instructs the same to start an original reading operation (steps S22 and S23). Then, the CPU 101 waits until an original size is notified from the CPU 12 (step S24). Upon receipt of the notification of the original size from the CPU 12, the CPU 101 instructs the memory control circuit 651 to secure a necessary memory area in the image memory 103. Then, when preparation for receiving image data is completed, the CPU 101 transmits an image request signal to the CPU 12 (step S25). The CPU 101 receives image data from the CPU 12 until reception of all image data items is completed (step S26).

On the other hand, if it is determined in the above-described step S4 that the on information has been output from the original detection sensor 7, i.e. that there is any original placed on the original tray 1, the CPU 101 notifies the CPU 12 of selection of the moving original-reading mode (step S5).

Then, the CPU 101 determines whether or not the double-sided reading mode is designated (step S6). If it is determined that the double-sided reading mode is designated, the CPU 101 notifies the CPU 12 of designation of the double-sided reading mode (step S7), whereas if it is determined that the double-sided reading mode is not designated, the CPU 101 skips over the step S7 to a step S8. The double-sided reading mode is for reading the front side and the back side of an original. In the present embodiment, when the double-sided reading mode is designated, images on both sides of an original are read by "one-pass double-sided simultaneous reading".

In the step 8, the CPU 101 determines whether or not the mixed originals-reading mode is designated. If it is determined that the mixed originals-reading mode is not designated, the CPU 101 instructs the CPU 12 to start an original reading operation (step S17). Then, the CPU 101 repeatedly executes the same processing as executed in the above-described steps S24 to S26 (steps S18 to S20) until reading of all originals on the original tray 1 has been completed (step S21). When the reading of all the originals on the original tray 1 has been completed, the CPU 101 terminates the present control process.

On the other hand, if it is determined in the step S8 that the mixed originals-reading mode is designated, the CPU 101 notifies the CPU 12 of designation of the mixed originals-reading mode and instructs the same to start an original reading operation (steps S9 and S10). Then, the CPU 101 waits for reception of a notification of an original size from the CPU 12 (step S11).

In a case where the automatic scaling mode has been set, according to a notification of an original size from the CPU 12, the CPU 101 calculates a reading magnification based on the notified original size and a size (recording size) of a sheet on which image formation is to be performed. Then, the CPU 101 secures a necessary memory area in the image memory 103 based on the original size and the reading magnification, similarly to the step S25.

On the other hand, if the automatic scaling mode has not been set, the CPU 101 secures a necessary memory area in the image memory 103 based on the notified original size. Then, when preparation for receiving image data is completed, the CPU 101 transmits an image request signal to the CPU 12 (step S12).

In the present embodiment, the image reading section 100 and the controller 200 share the workload of scaling of image data associated with an original size into image data associated with the size of a sheet on which image formation is to be performed. The CPU 101 notifies the CPU 12 of a reading magnification with which the image should be read by the image reading section 100 and an image request signal.

Sharing of the workload of scaling is decided in advance according to the scaling capabilities of the image reading section 100 and the controller 200. In the present embodiment, the share of workload by the image reading section 100 is minimum 50% and maximum 100%. For example, in a case where the automatic rotation of an image is off, the size of a sheet on which the image is to be formed is a statement or half letter (STMT) size (hereinafter referred to as the "STMT size"), and at the same time the notified original size is the LTR size, 100% is notified as the reading magnification of the image reading section 100, and the read image data is reduced with a scaling ratio of 50% by the controller 200. Further, in a case where the size of a sheet on which image formation is to be performed is the STMT size and at the same time the notified original size is the LGL size, a reading magnification of 50% is notified to the image reading section 100, and image data read with the reading magnification of 50% by the image reading section 100 is reduced with a scaling ratio of 78% by the controller 200.

Next, the CPU 101 waits for reception of a notification of an original size from the CPU 12 (step S13).

If it is determined that a notification of a new original size is received, the CPU 101 returns to the step S12, and the CPU 101 recalculates a reading magnification, and re-secures a necessary memory area in the image memory 103, based on the notified new original size. Then, when preparation for receiving image data is completed, the CPU 101 transmits information on the reading magnification together with an image request signal to the CPU 12.

On the other hand, if it is determined in the step S13 that no notification of a new original size is received, but it is determined in a step S14 that an image synchronization signal is received from the image reading section 100, the CPU 101 determines that there is no change in the original size and receives image data. When reception of all image data is completed (step S15), and a notification that reading of all originals on the original tray 1 is completed is received from the CPU 12 (step S16), the CPU 101 terminates the present control process.

Figure 8A:
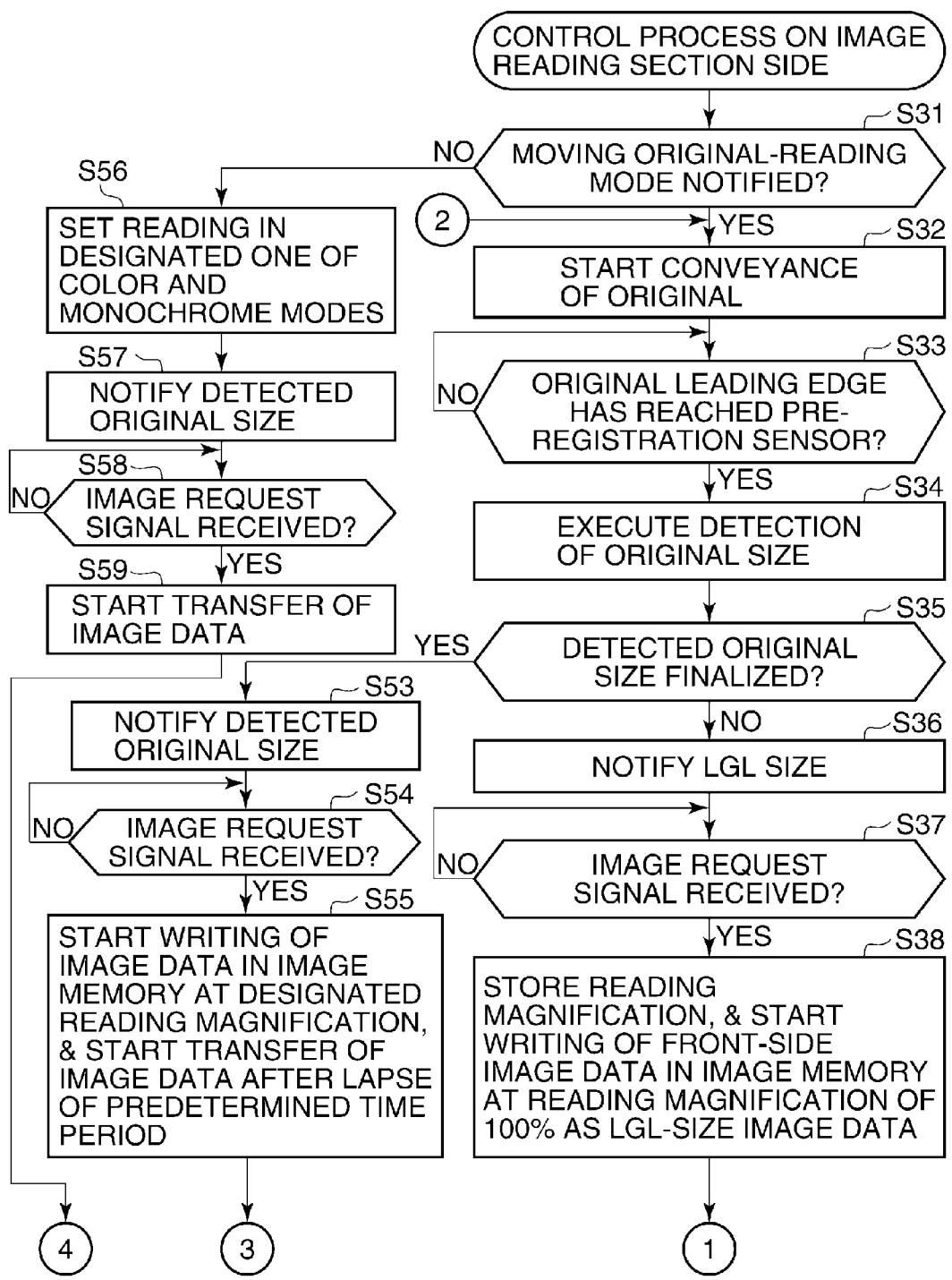
FIG. 8A is a flowchart of a control process executed by the image reading section, particularly by a CPU thereof, from the start of reading originals to the end of the same.
Figure 8B:
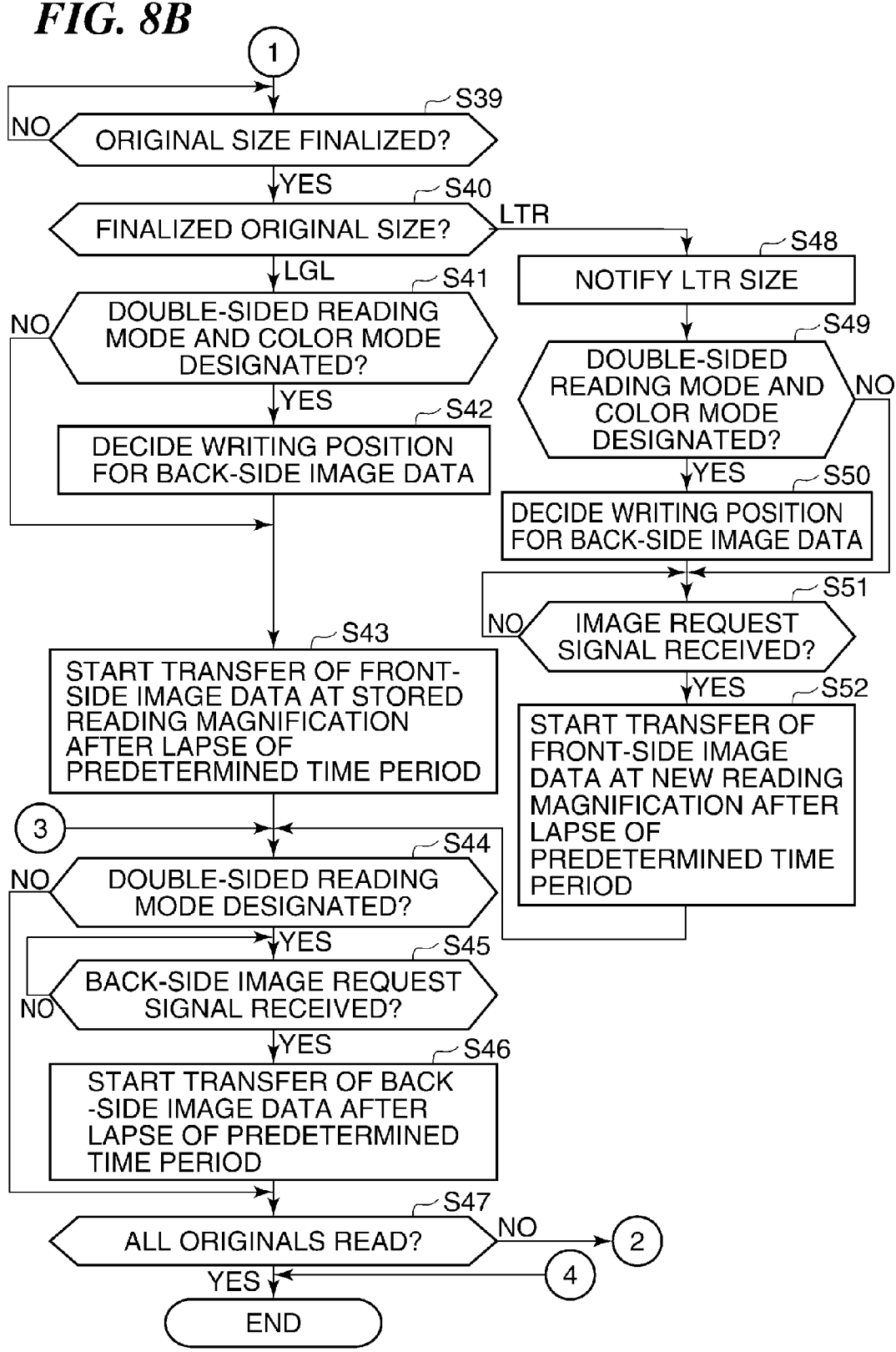
FIG. 8B is a continuation of FIG. 8A.

FIGS. 8A and 8B are flowcharts of a control process executed by the image reading section 100, particularly by the CPU 12 from the start of reading originals to the end of the same. As described hereinabove, the present control process is executed when the CPU 12 has received an instruction for starting an original reading operation, notified by the CPU 101. Hereinafter, the present control process will be described separately based on the following two cases:

(1) one in which an original size is finalized before the start of reading an original image, and (2) the other in which an original size is not finalized before the start of reading an original image.

Figure 10:
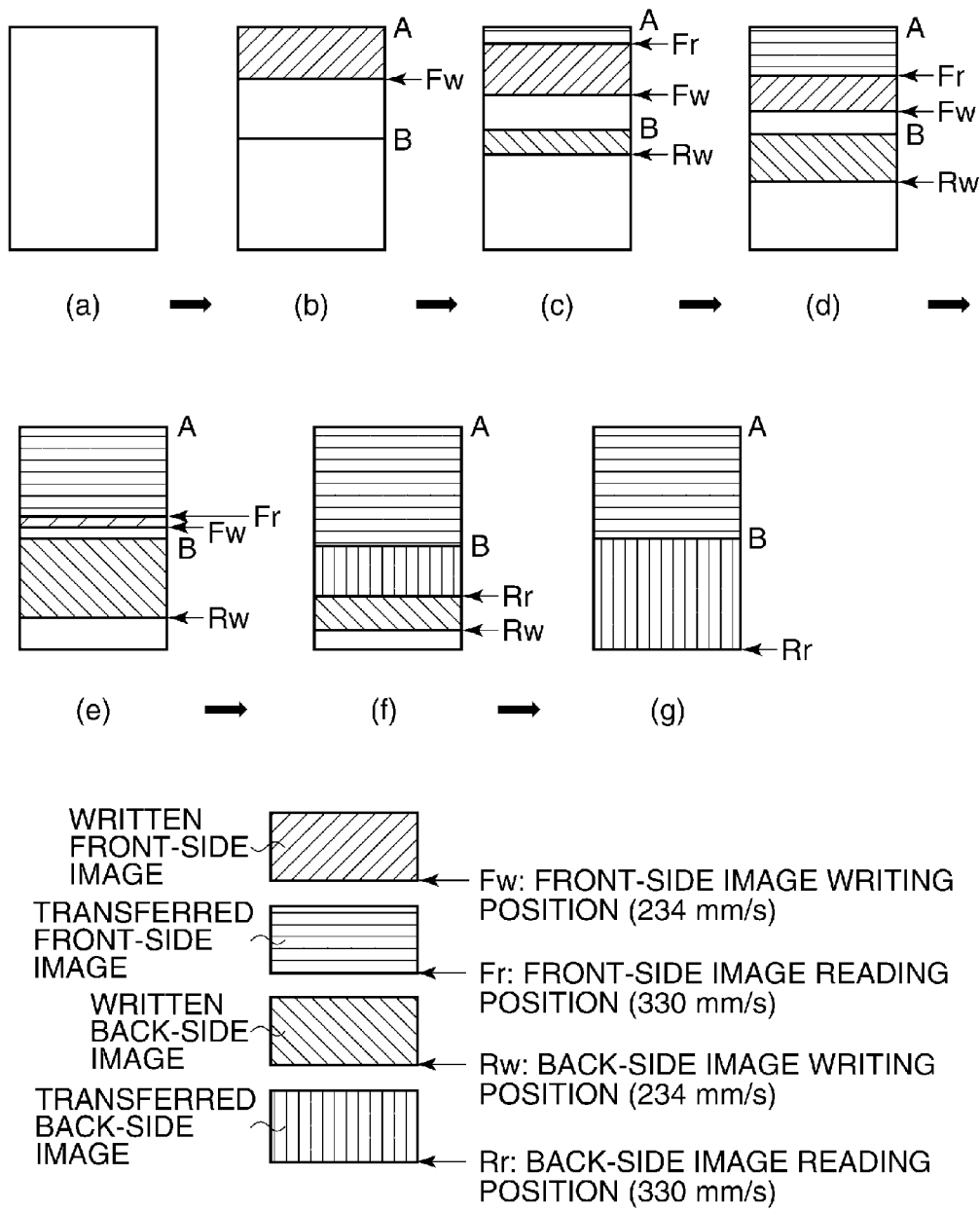
FIG. 10 is a view of an example of a storage state of the image memory in a case where an original size is not finalized before the start of reading an original image, particularly in a case where reading of a color double-sided LTR-size original is performed.
Figure 11:
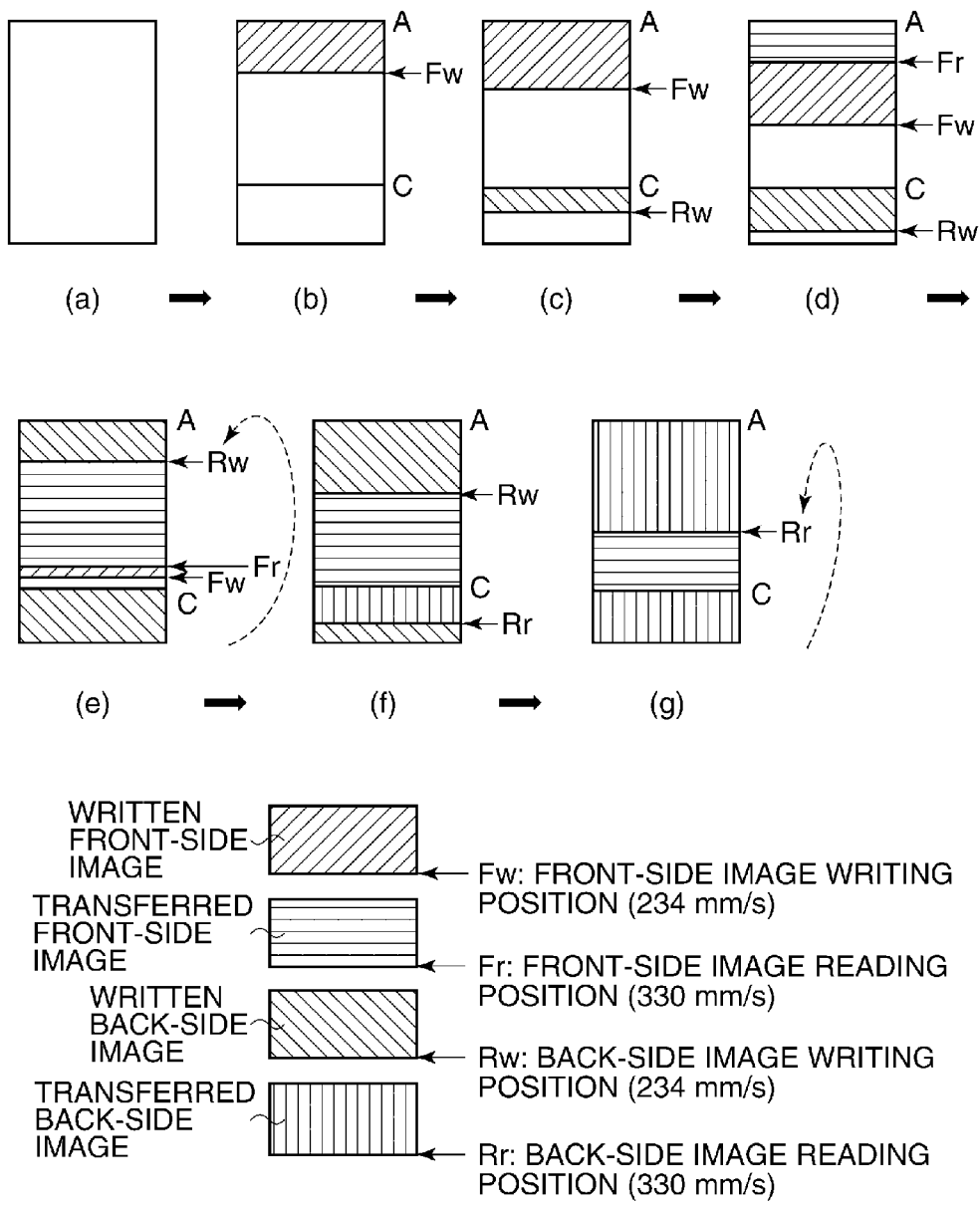
FIG. 11 is a view of an example of a storage state of the image memory in a case where an original size is not finalized before the start of reading an original image, particularly in a case where reading of a color double-sided LGL-size original is performed.

FIG. 9 is a view of an example of a storage state of the image memory 71 in the above-described case (1). FIG. 10 is a view of an example of a storage state of the image memory 71 in the above-described case (2), particularly in a case where reading of color double-sided LTR-size originals is performed. FIG. 11 is a view of an example of a storage state of the image memory 71 in the above-described case (2), particularly in a case where reading of color double-sided LGL-size originals is performed.

First, a description will be given of the control process performed in the case (1).

First, the CPU 12 determines whether or not the moving original-reading mode has been notified from the CPU 101 (step S31). If it is determined that the moving original-reading mode has not been notified, i.e. if the stationary original-reading mode has been notified, the CPU 12 prepares for a stationary reading operation. To this end, the CPU 12 creates white level reference data for a front-side image of an original, based on the color mode or the monochrome mode notified from the CPU 101 (step S56).

Next, the CPU 12 detects the size of an original placed on the platen glass 52 based on an output from a stationary-reading size detection sensor (not shown), and notifies the CPU 101 of the controller 200 of the detected original size (step S57). Then, the CPU 12 waits for reception of an image request signal from the controller 200 (step S58). In response to reception of the image request signal, the CPU 12 causes the front side-reading unit 59 to slide to thereby cause the front-side CCD line sensor 58 to read the original on the platen glass 52, and transfers image data read from the original to the controller 200 (step S59), followed by terminating the present control process.

On the other hand, if it is determined in the step S31 that the moving original-reading mode has been notified, the CPU 12 starts conveyance of an original from the original tray 1 (step S32), and waits until a leading edge of the conveyed original reaches the pre-registration sensor 14 (step S33). When the leading edge of the original reaches the pre-registration sensor 14 (in predetermined timing), the CPU 12 (decision unit) detects the size of the original according to a combination of sensor outputs shown in FIGS. 6A and 6B (step S34).

Next, the CPU 12 determines, based on the result of the detection, whether or not the original size has been finalized (step S35). In a case where the mixed originals-reading mode is set and a result of determination using the decision tables in FIGS. 6A and 6B indicates LGL/LTR, the CPU 12 determines that the original size has not been finalized.

If the original size has been finalized, the CPU 12 (communication unit) notifies the controller 200 of the finalized original size (step S53). Then, the CPU 12 waits for reception of an image request signal from the controller 200 (step S54). Upon receipt of the image request signal, the CPU 12 reads an image based on a reading magnification received together with the image request signal.

At this time, the CPU 12 instructs the memory control circuit 651 to normally divide the memory area of the image memory 71 in a non-overlap mode. For example, in a case where the double-sided reading mode is designated, the original is A4-sized, the color mode is designated, and further a reading magnification of 100% is designated, the image memory 71 can store two pages of image data. Therefore, as illustrated in (a) of FIG. 9, the CPU 12 divides the memory area of the image memory 71 into two areas, and writes front-side image data and back-side image data in respective different areas.

Note that in the present embodiment, when a reading magnification of 100% is designated, reading of an original is performed while conveying the same at 234 mm/sec. When a reading magnification of 50% is designated, reading of an original is performed while conveying the same at 468 mm/sec. Image data read from the original is written in the image memory 71. That is, each original is read at a resolution corresponding to a conveying speed of the original. For example, when the conveying speed of the original is twice faster, the resolution of the original in the sub scanning direction is reduced by half, and hence the amount of image data generated per page is reduced by half.

The image data written in the image memory 71 start to be transferred to the image processor 102 before completion of writing image data corresponding to an entire image on the original.

The read-out of image data recorded in the image memory 71, i.e. transfer of the same to the image processor 102 is executed at a speed faster than a speed of conveying an original (corresponding to a conveying speed of 330 mm/sec in the present embodiment). Therefore, the transfer of the image data written in the image memory 71 is started when a predetermined time period has elapsed after the start of writing image data in the image memory 71 (step S55).

Hereinafter, a description will be given of a predetermined waiting time period in the step S55.

Part (a) of FIG. 9 shows a state of the image memory 71 before the start of writing image data, part (b) of FIG. 9 shows a storage state of the image memory 71 immediately after the start of writing the front-side image data of the original in the image memory 71, and part (c) of FIG. 9 shows a storage state of the image memory 71 at the start of transfer of the image data after the lapse of the predetermined waiting time period. In FIG. 9, "A" indicates a write start position for the front-side image data, and "B" indicates a write start position for the back-side image data. An arrow Fw indicates a current writing position in the memory 71 at which the front-side image data is written. This writing position indicated by the arrow Fw is moving at a write speed of 234 mm/sec. Since writing of image data into the image memory 71 corresponds to conveying of an image being read, and hence the write speed of 234 mm/sec is conversion of the write rate of image data into a conveying speed of the original when the reading magnification is 100%. In the present embodiment, to make it easy to understand the relationship between the writing of image data into the image memory 71 and read-out of image data from the image memory 71, and the conveyance of an original, the description is given by expressing the write speed of image data into the image memory 71 (moving speed of the writing position in the image memory 71) by the conveying speed of the original when the reading magnification is 100%, and converting the read-out speed of image data from the image memory 71 (moving speed of the reading position in the image memory 71) into a conveying speed based on a ratio of the read-out speed to the write speed. An arrow Fr indicates a reading position in the memory 71 from which the front-side image data is read out for transfer thereof. This arrow Fr is moving at a read-out speed of 330 mm/sec. Thus, the read-out speed is higher than the write speed, and hence it is necessary to wait for a predetermined time period such that the arrow Fr is prevented from overtaking and passing the arrow Fw when the reading of image data of the original having a sub-scanning length (210 mm, in the A4-size original) has been completed (part (e) of FIG. 9). By subtracting a time period required to read the image data (636 msec, in the present embodiment) from a time period required to write the image data (897 msec, in the present embodiment), the predetermined time period (261 msec, in the present embodiment) is calculated. Note that in the present embodiment, the distance from the platen roller 17 to the back side-reading roller 19 is 80 mm, and the original conveying speed is 234 mm/sec, so that a time period to elapse from the start of writing the front-side image data to the start of writing the back-side image data is 341 msec. Therefore, as shown in part (d) of FIG. 9, after the start of read-out i.e. transfer of the front-side image data, writing of the back-side image data is started.

After the start of read-out i.e. transfer of the front-side image data, if it is determined that the double-sided reading mode is designated (step S44 in FIG. 8B), the CPU 12 waits for reception of a back-side image request signal (step S45). Upon receipt of the back-side image request signal, after waiting for a predetermined time period similarly to the above-described step S55, the CPU 12 starts read-out i.e. transfer of the back-side image data (step S46). That is, as shown in part (f) of FIG. 9, similarly to the transfer of the front-side image data, the CPU 12 waits for the predetermined time period and then starts read-out i.e. transfer of the back-side image data, such that an arrow Rr indicating a reading position of the back-side image data is prevented from overtaking and passing an arrow Rw indicating a writing position for the back-side image data. Part (g) of FIG. 9 shows a storage state of the image memory 71 at the time of completion of the above read-out i.e. transfer.

As described above, in a case where the double-sided reading mode is designated, and at the same time the image memory 71 can store two pages of image data, i.e. the front-side image data and the back-side image data, the CPU 12 divides the image memory 71 into two areas, and writes the front-side image data and the back-side image data in respective different areas, as shown in FIG. 9.

Next, a description will be given of the control process performed in the above-described case (2), particularly in a case where color double-sided LTR-size originals are mixed in an original bundle, and reading thereof is performed.

First, the CPU 12 executes the steps S31 to S35 in the mentioned order. Since it is determined in the step S35 that the size of the originals is not finalized, the CPU 12 (communication unit) provisionally decides a maximum possible candidate size (provisional original size: the LGL size, in the present embodiment) as an original size, and notifies the controller 200 of the provisionally decided original size (step S36). Then, the CPU 12 waits for reception of an image request signal from the controller 200 (step S37). Upon receipt of the image request signal, the CPU 12 stores a reading magnification received together with the image request signal in the RAM 90, and starts to read an image from the original at the reading magnification of 100%, which is the maximum reading magnification, i.e. starts to write the image data in the image memory 71 (step S38). At this time, in the case where the double-sided reading mode is designated and at the same time the color mode is designated, the CPU 12 instructs the memory control circuit 651 such that the image memory 71 can be used in the overlap mode, as shown in part (a) of FIG. 10. In other words, in the step S38, the CPU 12 does not decide the write start position "B" for back-side image data.

After the start of reading the image from the original, the CPU 12 waits for finalization of the original size (step S39 in FIG. 8B). The CPU 12 checks the state of output from the post-separation sensor 11 in timing at which the trailing edge of an original of a size (the LTR size, in the present embodiment) second largest of all original size candidates passes the post-separation sensor 11, to thereby finalize the original size. In the present embodiment, the distance from the post-separation sensor 11 to the pre-registration sensor 14 is 230 mm, and the distance from the pre-registration sensor 14 to the platen roller 17 is 30 mm. Therefore, the CPU 12 checks the state of output from the post-separation sensor 11, when a leading edge of the original reaches a location 30 mm away from the front side-reading position corresponding to the location of the platen roller 17 after passing the platen roller 17, by taking into account a margin, such as variation in output from the post-separation sensor 11, to thereby finalize the original size (step S40). Further, in the present embodiment, since the distance from the platen roller 17 to the back side-reading roller 19 is 80 mm, reading of a back-side image has not started to be performed yet at this time (part (b) of FIG. 10).

When the original size finalized in the step S40 is the LTR size, i.e. when the finalized original size is different from the original size (=the LGL size) notified in the step S36, the CPU 12 (communication unit) re-notifies (retransmits) the correct original size to the controller 200 (step S48).

Next, the CPU 12 determines whether or not the double-sided reading mode is designated and at the same time the color mode is designated, i.e. whether or not writing of the back-side image data in the overlap mode is in progress (step S49). If it is determined that the writing of the back-side image data in the overlap mode is in progress, the CPU 12 decides the writing position for the back-side image data (step S50). In the case of an original having the LTR size, respective image data items on both sides of the original can be stored in the image memory 71, and hence there is no need to cause a writing area of front-side image data to overlap a writing area of back-side image data. Therefore, the CPU 12 sets the writing position for the back-side image data to a position B in part (b) of FIG. 10, i.e. a location at which the image memory 71 is divided into two areas (step S50). That is, the CPU 12 executes the same processing as described with reference to FIG. 9 without causing the writing area of front-side image data to overlap the writing area of back-side image data.

After that, the CPU 12 waits for an image request signal which is to be received from the controller 200, at timing dependent on the correct original size re-notified in the step S48 (step S51). Upon receipt of the image request signal, the CPU 12 (communication unit) starts transfer of the front-side image data with a new reading magnification received together with the image request signal (step S52). The memory control circuit 651 performs scaling processing on image data read out from the image memory 71 with a reduction ratio decided based on the reading magnification (100%) set in the step S38 and the new reading magnification.

As described above, when the original size finalized in the step S40 enables the front-side image data and the back-side image data to be stored in the image memory 71, the writing area of the front-side image data and the writing area of the back-side image data are not caused to overlap each other. The difference between the processing shown in FIG. 10 and the processing shown in FIG. 9 lie in timing for deciding the position B as the write start position for the back-side image data. This timing is different according to the difference between timings for finalizing the original sizes.

Hereinafter, a description will be given of the predetermined waiting time period in the step S52.

Parts (c) and (d) of FIG. 10 show transferred states of the image data after waiting for respective certain time periods. In each of the parts (c) and (d) of FIG. 10, the arrow Fw indicates a writing position in the image memory 71 at which front-side image data is written. This arrow Fw is moving at the write speed of 234 mm/sec. The arrow Fr indicates a reading position in the image memory 71 from which front-side image data is read out in order to transfer the front-side image data. This arrow Fr is moving at the read-out speed of 330 mm/sec. As described above, the read-out speed is higher than the write speed, and therefore it is necessary to wait for a predetermined time period such that the arrow Fr is prevented from overtaking and passing the arrow Fw when the read-out i.e. transfer of image data of the original which has a sub-scanning length (280 mm, in the LTR size) has been completed (part (e) of FIG. 10). The predetermined time period (348 msec, in the present embodiment) is calculated by subtracting a time period required to read out i.e. transfer the image data (848 msec, in the present embodiment) from a time period required to write the image data (1196 msec, in the present embodiment).

In the case where the above-described step S48 is executed to thereby notify the correct original size to the controller 200, transmission and reception of a command occur between the CPU 12 and the CPU 101 of the controller 200. Because of this, reaction of the controller 200 is sometimes delayed depending on the processing state of the controller 200. When this delay occurs to delay timing of reception of a second image request signal from the controller 200, the start of read-out i.e. transfer of the front-side image data is also delayed (step S51). However, writing of back-side image data is started after the lapse of 341 msec from the start of writing the front-side image data, irrespective of the delay of reaction of the controller 200. Further, when a magnification of 50% is designated by the second image request signal from the controller 200, image data is transferred from the image memory 71 using the above-described memory-based scaling function at the designated magnification. In the present embodiment, this memory-based scaling function is a reduction scaling function in which average pixels of two lines in the sub-scanning direction are transferred as pixels of one line in the sub-scanning direction, and hence the read-out speed at which the image data is transferred remains 330 mm/sec. However, if a scaling function is employed in which the read-out speed is changed depending on a scaling ratio, it is necessary to calculate a waiting time period using read-out time based on the scaling function.

After the start of read-out i.e. transfer of the front-side image data, when the double-sided reading mode is designated (step S44), the CPU 12 waits for reception of a back-side image request signal (step S45). Upon receipt of the back-side image request signal, the CPU 12 (communication unit) waits for a predetermined time period, similarly to the above-described step S55, and then starts read-out i.e. transfer of the back-side image data (step S46). That is, as shown in part (f) of FIG. 10, similarly to the read-out i.e. transfer of the front-side image data, the CPU 12 waits for a predetermined time period and then starts transfer of the back-side image data, such that the arrow Rr indicating a reading position for the back-side image data is prevented from overtaking and passing the arrow Rw indicating a writing position for the back-side image data. Part (g) of FIG. 10 shows a state of completion of the transfer.

Although the above description has been given of image reading of one original, this processing is repeatedly executed until reading of all originals is completed (step S47).

Next, a description will be given of processing executed in the case of the original size finalized in the step S40 being the LGL size. When the original size is the LGL size, the image memory is controlled by overlap processing.

Since it is determined in the step S40 that the finalized original size is the LGL size, i.e. since the finalized original size matches the original size notified in the step S36, the CPU 12 proceeds to a step S41, wherein the CPU 12 determines whether or not the double-sided reading mode is designated and at the same time the color mode is designated, i.e. whether or not writing of the front-side image data in the overlap mode is in progress (step S41). If it is determined in the step S41 that the writing of the front-side image data in the overlap mode is in progress, the CPU 12 decides a writing position for the back-side image data (step S42).

In the case of the original size being the LGL size, respective image data items on both sides of the original cannot be stored in the image memory 71, the writing area of the front-side image data and the writing area of the back-side image data are caused to overlap each other. The image memory 71 has an A3-size storage area which is larger than the LGL size. Therefore, in the present embodiment, as shown in part (b) of FIG. 11, the CPU 12 secures an area from the write start position A for the front-side image data, which is necessary for storing LGL-size front-side image data, and then sets a write start position C for back-side image data. After that, upon the lapse of a predetermined time period, the CPU 12 (communication unit) stats transfer of the front-side image data at the reading magnification stored in the above-described step S38 (step S43).

Next, a description will be given of a predetermined waiting time period in the step S43.

Part (b) of FIG. 11 shows a storage state of the image memory 71 immediately after the start of writing front-side image data of an original in the image memory 71, and part (c) of FIG. 11 shows a storage state of the image memory 71 immediately after the start of writing back-side image data of the original in the image memory 71, after conveyance of the original proceeds to finalize the original size. During change in the storage state of the image memory 71 from the state shown in part (b) of FIG. 11 to the state shown part (c) of FIG. 11, the read-out i.e. transfer of the front-side image data has not been started yet. Part (d) of FIG. 11 shows a state where the read-out i.e. transfer of the image data has been started after the lapse of the predetermined waiting time period. In FIG. 11, the arrow Fw indicates a writing position in the image memory 71 at which front-side image data is written. The arrow Fw is moving at a write speed of 234 mm/sec. The arrow Fr indicates a reading position in the image memory 71 from which front-side image data is read out in order to transfer the front-side image data. The arrow Fr is moving at a transfer speed of 330 mm/sec. Thus, the read-out speed is higher than the write speed, and hence it is necessary to wait for a predetermined time period such that the arrow Fr is prevented from overtaking and passing the arrow Fw when the read-out i.e. transfer of image data of the original having a sub-scanning length (356 mm, in the LGL-size original) is completed. The predetermined time period (443 msec, in the present embodiment) is calculated by subtracting a time period required to read out the image data (1078 msec, in the present embodiment) from a time period required to write the image data (1521 msec, in the present embodiment). Further, in a case where the double-sided reading mode is designated and at the same time the color mode is designated, it is necessary to start read-out i.e. transfer of the front-side image data, due to the overlap mode, before the arrow Rw indicating a writing position for back-side image data reaches a write start position A for front-side image data, i.e. prior to a timing at which an area extending from a write start position C for the back-side image data to an end of the image memory 71 is filled with back-side image data, as shown in part (e) of FIG. 11. Further, in a case where the reading magnification of 50% has been designated by an image request signal from the controller 200, the image data is transferred from the image memory 71 using the above-described memory-based scaling function at the designated magnification. In the present embodiment, this memory-based scaling function is a reduction scaling function in which average pixels of two lines in the sub-scanning direction are transferred as pixels of one line in the sub-scanning direction, and hence the read-out speed at which the image data is transferred remains 330 mm/sec. However, if a scaling function is employed in which the read-out speed is changed depending on a scaling ratio, it is necessary to calculate a waiting time period using read-out time based on the scaling function.

Note that in the present embodiment, the distance from the platen roller 17 to the back side-reading roller 19 is 80 mm, and the original conveying speed is 234 mm/sec, so that a time period to elapse from the start of writing front-side image data to the start of writing back-side image data is 341 msec. Further, in the present embodiment, a time period taken for the arrow Rw to reach the position A after the start of writing the back-side image data from the position C is 204 mm in terms of the length of an original, and hence is 871 msec when converted to time. Therefore, a time period taken for the arrow Rw, which indicates the writing position for back-side image data, to reach the position A after the start of writing front-side image data, is 341 msec+871 msec=1212 msec. However, this time period is longer than a time period of 443 msec, which should elapse after the start of writing front-side image data before the front-side image data becomes capable of being read out for transfer, and hence it is possible to start to read out i.e. transfer the front-side image data when 443 msec has elapsed after the start of writing the front-side image data from the position A (step S43). This is not limitative, but when the above-described relationship in length of time is inverted due to the configuration of the original reader, it is possible to perform processing for writing data in the image memory and transferring data therefrom, by reducing the read-out speed of front-side image data or like processing.

As described hereinabove, when the size of an original is the LGL size, the image memory 71 cannot store image data items on both sides of the original. However, the CPU 12 has already received a front-side image request signal from the controller 200 (step S37), and no new command is exchanged between the CPU 12 and the controller 200 until read-out i.e. transfer of the image data of the original is started. In the case where originals different in size are mixed as described above, if an original size is not finalized, the largest one of all original size candidates is notified in advance, whereby it is possible to prevent occurrence of a problem that the image memory 71 is flooded with image data by delay of a command from the controller 200, failing to transfer read image data.

After the start of transfer of front-side image data, when the double-sided reading mode is designated (step S44), the CPU 12 waits for reception of a back-side image request signal (step S45). Upon receipt of the back-side image request signal, the CPU 12 waits for a predetermined time period, similarly to the above-described step S55, and then starts read-out i.e. transfer of back-side image data (step S46). That is, as shown in part (f) of FIG. 11, similarly to the read-out i.e. transfer of the front-side image data, the CPU 12 waits for a predetermined time period and then starts read-out i.e. transfer of the back-side image data, such that the arrow Rr indicating a reading position for back-side image data is prevented from overtaking and passing the arrow Rw indicating the writing position for back-side image data. Part (g) of FIG. 11 shows a state of completion of the transfer.

Although the above description has been given of image reading of one original, this processing is repeatedly executed until reading of all originals is completed (step S47).

As described heretofore, according to the present embodiment, it is possible, in the case of the original reader of the one-pass double-sided simultaneous reading type, to reduce the length of a conveying path from a point for feeding originals to a point for reading thereof, and execute an automatic sheet selection function and an automatic magnification selection function without additionally providing an inversion path and without requiring a large-capacity image memory.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-062070 filed Mar. 19, 2012, which is hereby incorporated by reference herein in its entirety.

What is claimed is:

1. An original reader comprising:
   a conveying unit configured to convey an original;
   an original detection unit disposed in a conveying path for conveying the original and configured to detect the conveyed original;
   a reading unit configured to read the conveyed original;
   a decision unit configured to decide a size of the original conveyed by said conveying unit based on a result of detection by said original detection unit;
   a storage unit configured to store image data output from said reading unit; and
   a communication unit configured to transmit the size decided by said decision unit, and transmit the image data stored in said storage unit according to an image request signal,
   wherein if said decision unit cannot decide the size of the original at a predetermined timing, said communication unit transmits the maximum one of a plurality of original sizes, which are candidates of the size of the original to be decided based on a result of detection by said original detection unit, as a provisional original size, and
   wherein after said decision unit has decided the size of the original, if the size of the original decided by said decision unit is different from the provisional original size, said communication unit retransmits the size of the original decided by said decision unit.

2. The original reader according to claim 1, further comprising a detection unit disposed in the conveying path at a location downstream of the original detection unit and configured to detect the conveyed original, and
   wherein the predetermined timing is a timing associated with detection of the original by said detection unit.

3. The original reader according to claim 2, wherein said decision unit decides the size of the original conveyed by said conveying unit based on the result of detection by said original detection unit at a time point said detection unit detects the original.

4. The original reader according to claim 1, wherein said communication unit receives a scaling ratio in response to transmission of the size of the original, and
   wherein said communication unit comprises a scaling unit configured to scale image data stored in said storage unit according to the received scaling ratio.

5. The original reader according to claim 1, wherein said communication unit transmits the image data stored in said storage unit in response to reception of the image request signal.

6. An original reader comprising:
   a conveying unit configured to conveying an original;
   an original detection unit disposed in a conveying path for conveying the original and configured to detect the conveyed original;
   a first reading unit configured to read a first side of the conveyed original;
   a second reading unit configured to read a second side of the conveyed original, which is different from the first side;
   a storage unit configured to store first image data output from said first reading unit and second image data output from said second reading unit; and
   a control unit configured to control writing of the first image data and the second image data in said storage unit, and reading of the first image data and the second image data stored in said storage unit,
   wherein said control unit sets a write start position at which the second image data starts to be written in said storage unit, after a storage area in which the first image data is written, and
   wherein said control unit writes part of the second image data in a storage area from which the first image data written in said storage unit has been read out from said storage unit.

7. A document reading method executed by a document reader comprising:
   a tray on which a document is mounted;
   a sensor configured to detect a width of the document mounted on the tray;

a conveying unit configured to convey the document mounted on the tray along a conveying path;

a detection unit configured to detect the conveyed document;

a reading unit configured to read the conveyed document;

a memory configured to store the image data output from the reading unit; and a communication line configured to communicate with a controller;

wherein the document reading method comprises a determining step of determining a size of the conveyed document based on a result of detection by the sensor, the determining step including the steps of:

(i) in a case where the size of the conveyed document is determined in the determining step, notifying, the determined size to the controller through the communication line, writing the image data output from the reading unit in the memory, and transmitting the image data stored in the memory to the controller through the communication line; and (ii) in a case where the size of the conveyed document is not determined in the determining step;

transmitting the maximum one of a plurality of document sizes, which are candidates of the size of the document to be selected in said determining step, to the controller through the communication line;

writing the image data output from the reading unit in the memory based on a request signal received from the controller through the communication line;

finalizing the size of the conveyed document based on a result of detection of the detection unit;

transmitting, in a case where the finalized size and the determined size are identical with each other, the image data stored in the memory to the controller through the communication line;

notifying, in a case where the finalized size and the determined size are different from each other, the finalized size to the controller through the communication line; and transmitting the image data stored in the memory to the controller through the communication line according to the request signal received from the controller through the communication line.

8. A method of reading an original, comprising:

conveying an original;

detect the conveyed original;

reading a first side of the conveyed original;

reading a second side of the conveyed original, which is different from the first side;

storing first image data output by said reading the first side and second image data output by said reading the second side, in a storage unit;

controlling writing of the first image data and the second image data in the storage unit, and reading of the first image data and the second image data stored in the storage unit;

setting a write start position at which the second image data starts to be written in the storage unit, after a storage area in which the first image data is written; and writing part of the second image data in a storage area from which the first image data written in the storage unit has been read out from the storage unit.

* * * * *